United States Patent [19]

Carpenter

[11] Patent Number: 5,372,641
[45] Date of Patent: Dec. 13, 1994

[54] CEMENT SLURRIES FOR WELLS

[75] Inventor: Robert B. Carpenter, Allen, Tex.

[73] Assignee: Atlantic Richfield Company, Los Angeles, Calif.

[21] Appl. No.: 62,879

[22] Filed: May 17, 1993

[51] Int. Cl.$^5$ .............................................. C04B 24/00
[52] U.S. Cl. .................................. 106/714; 106/724; 106/790; 106/822
[58] Field of Search ............... 106/714, 782, 789, 790, 106/664, 819, 823, 724, 719, 822

[56] References Cited

U.S. PATENT DOCUMENTS

| | | | |
|---|---|---|---|
| 2,890,752 | 6/1959 | Crone et al. | 166/22 |
| 3,861,468 | 1/1975 | Curtice et al. | 166/276 |
| 3,862,663 | 1/1975 | Curtice et al. | 166/276 |
| 4,124,075 | 11/1978 | Messenger | 166/293 |
| 4,618,369 | 10/1986 | Smith-Johannsen | 106/664 |
| 4,627,496 | 12/1986 | Ashford et al. | 166/292 |
| 4,883,125 | 11/1989 | Wilson et al. | 166/291 |
| 5,213,160 | 5/1993 | Nahm et al. | 166/293 |

OTHER PUBLICATIONS

Anonymous disclosure in the publication *Research Disclosure*, Jun. 1992.

"Lost Circulation" by Joseph U. Messenger, Pennwell Publishing Company, Tulsa, Okla. 1981 no month.

"Case Histories Regarding the Application of Microfine Cements" by J. F. Heathman and L. E. East, Jr., IADC/SPE 23926, Society of Petroleum Engineers, Richardson, Tex., 1992 no month.

"Well Cementing Achieved with Slug of Converted Drilling Fluid", *Offshore Oilman*, Nov. 1992.

*Primary Examiner*—Mark L. Bell
*Assistant Examiner*—Paul Marcantoni
*Attorney, Agent, or Firm*—Michael E. Martin

[57] ABSTRACT

Moderate strength cement plugs and viscous pills may be formed by adding slag cement in both conventional particle size and microfine particle sizes to oil-based drilling fluids which contain water as the internal phase of an oil-water emulsion. The water may be present as a calcium chloride brine. Quantities of cementitious mixtures including slag cement, hydrocarbon oil, setting activators, such as sodium hydroxide and sodium carbonate, and nonyl phenol surfactants may be pumped into wellbores using conventional circulation techniques or conventional squeeze cementing techniques to form cement plugs, control lost circulation, or fix certain hydrocarbon oil wastes for disposal in subterranean formations.

4 Claims, No Drawings

CEMENT SLURRIES FOR WELLS

BACKGROUND OF THE INVENTION

1. Field of the Invention

The present invention pertains to cement compositions formed from regular and microfine ground slag cements and oil based drilling fluids comprising water in oil emulsions, for controlling lost circulation and other cement plugging applications in wells.

2. Background

In drilling and completing oil and gas wells, for example, it is well-known practice to pump Portland cement mixtures into the wellbore to form a seal between the well casing and the earth formation, to control lost circulation of the drilling fluid and to plug portions of the wellbore for various purposes including forming a foundation for side-tracking or drilling a deviated wellbore from the original wellbore. Conventional water-based Portland cement slurries are often pumped into the well to control lost circulation or to otherwise set a "cement plug" in the wellbore. Typically, an excess volume of the cement mixture is pumped into the well to compensate for the adverse effects of contamination of the cement mixture by the presence of drilling fluids or "muds" particularly oil-based muds, in the wellbore. The excess volume of cement is used to provide enough settable cement for a competent plug in contemplation that a large portion of the cement will become contaminated and not be a settable composition. Moreover, the oil wetting type surfactants that are used to formulate oil-based drilling muds also impede cement hydration reactions. The oil wet surfaces of the cement particles cannot sufficiently mix with hydration water to provide adequate strength development. The cement dilution that results from drilling mud contamination also reduces the compressive strength of that portion of the cement which will actually harden or set.

Quite often, a cement plug is desired to be placed in the wellbore a considerable distance above the bottom of the well. These plugs are particularly prone to failure from drilling mud contamination since the Portland cement slurry is generally more dense than the drilling mud and undergoes gravitational movement which forces intermixing of the drilling mud with the cement slurry, again resulting in a cement composition which has inadequate compressive strength or may simply, through gravitational forces, fall far below the target position of the plug in the wellbore. Multiple, expensive attempts to set cement plugs often result from prior art problems with conventional Portland cement based slurries when exposed to oil-based drilling fluids.

Still further, so-called "pills" or slugs of viscous fluid have been used to minimize the falling or unwanted separation of relatively dense cement slurries to prevent the slurries from falling through less dense water-based drilling fluids or completion fluids. The viscous fluid pills are designed to serve as a platform for setting conventional Portland cement plugs above the well bottom. The goal in this case is to reduce potential fluid movement and contamination of the cement mixture. While such viscous fluid pills are often used, they are not consistently successful. Viscous pills work very poorly in deviated wellbores since the different fluids in the well tend to slip past each other. Moreover, the use of viscous fluid pills in wells which are occupied by oil-based mud is even less likely to be successful since the oil-wetting properties of these muds reduce the desirable properties of the pills. Desirable rheological characteristics of viscous pills for wells are extreme apparent viscosity, very high yield point, high gel strength and a high rate of gel strength development. In some applications it is even more advantageous if the viscous pill forms a true solid with measurable compressive structural strength. These viscous pill properties are generally obtainable when pumping viscous pills into wells occupied by water-based muds by adding concentrations of bentonite, certain polymers and the use of Portland cement. However, the development of viscous pills with a desirable rate of gel strength development (progressive gelation) and compressive strength have not been obtainable in an oil-based mud environment. In this same regard, squeeze cementing and the placement of cement plugs in oil-based muds using conventional Portland cements are often unsuccessful.

U.S. Pat. No. 2,890,752, issued Jun. 16, 1959 to Crone, et al, describes a squeeze cementing composition wherein conventional Portland oil well cement is mixed with kerosene, diesel oil or crude oil, together with octyl phenol and ethylene oxide as a surfactant to provide a low-pressure squeeze cement composition to block water-producing zones in an earth formation. U.S. Pat. No. 3,861,468 to Curtice, et al, issued Jan. 21, 1975, describes a method of treating permeable, unconsolidated, sand-containing formations wherein Portland cement, a hydrocarbon oil such as kerosene or diesel oil and refined motor oil and an aqueous carrier medium is pumped into a wellbore and into a formation to be consolidated. U.S. Pat. No. 3,862,663 to Curtice, et al, and issued Jan. 28, 1975, also describes a method for treating an oil-containing incompetent earth formation with a composition which includes a refined lubricating oil fraction, an oil-wetting agent and Portland cement in a water carrier liquid. U.S. Pat. No. 4,124,075, issued November 7, 1978 to Messenger, describes a water-based Portland cement slurry which is placed against an evaporite formation section after an oil-wetting liquid is flowed through and in contact with the section. In the publication entitled "Lost Circulation" Pennwell Publishing Company, Tulsa, Oklahoma, 1981Messenger describes a composition for forming cement plugs which includes bentonite, API Class G Portland cement and diesel oil. A publication entitled "Case Histories Regarding the Application of Microfine Cements" by Heathman and East, Jr., IADC/SPE 23926Society of Petroleum Engineers, Richardson, Texas, describes the use of so-called microfine cements to prepare casing leaks, and stop water encroachment into a well using cement slurries with small particle size (8 to 15 microns) cement materials in conventional water-based slurries. An article entitled "Well Cementing Achieved with Slug of Converted Drilling Fluid", *Offshore/Oil Man*, November 1992, describes the use of hydraulic blast furnace slag added to water-based drilling fluid to serve as a well cement mixture. An anonymous disclosure in the publication *Research Disclosure*, June 1992, describes a cement composition containing blast furnace slag in microfine particle size, diesel or light oil, surfactant, slag activator and water which is batch mixed and pumped into a wellbore as a fluid loss or fluid production control agent. This mixture is designed to set only upon contact with produced water in the wellbore and any portion of the mixture that does not contact the produced water in the wellbore remains fluid and is circulated out of the well.

With this background of problems and the state-of-the-art in developing cement plugs and viscous fluid "pills" for use in wells occupied by oil-based drilling muds, a surprising discovery has been made in accordance with the present invention.

SUMMARY OF THE INVENTION

The present invention provides an improved cement composition which may be used in conjunction with oil-based drilling muds and oil wastes to form settable cement plugs in wells, viscous fluid slugs or "pills" which may be used to control lost circulation in wells and foundations or platforms for supporting conventional cement plugs. The cement composition may be used to fix oil waste materials in place in subterranean cavities as a way of storing or disposing of such waste materials.

In accordance with an important aspect of the present invention, cement compositions characterized by conventional particle size slag cement or so-called microfine slag cement material together with oil-based drilling fluids or other emulsions of hydrocarbon fluids are formed and comprise cementitious materials having characteristics of rate of compressive strength development and final compressive strength which can be adjusted to accomplish desired results in oil and gas well operations.

In accordance with another important aspect of the invention, a cement composition comprising oil, a weighting agent, slag cement, water or brine and emulsifiers is provided and forms a water-in-oil emulsion suitable for pumping to a predetermined place in a well to form a settable plug or mass.

In accordance with yet a further aspect of the present invention, cement compositions are provided which have improved gel strength and compressive strength by the use of additives such as amorphous silica, calcium sulfate, water, styrene butadiene, latex, organophillic clays, clay modifiers and certain other cement and drilling fluid additives.

The improved cement composition is operable to serve as a fast-setting platform or foundation for conventional cement plugs, as a cementitious, viscous fluid slug or pill for use in controlling lost circulation in wells and as a fixing medium for disposal of waste materials.

The cement composition of the present invention is particularly advantageous in that wells drilled with oil-based drilling fluids may be more easily controlled to stop or minimize lost fluid circulation and plugs or platforms may be provided in such wells for supporting other cement plugs. Similar compositions using Portland cement in place of slag cement fail to hydrate and develop suitable strength. Accordingly, the particular slag cement compositions of the present invention have distinct advantages over prior cement compositions.

The present invention also provides an improved method of placing the improved cement compositions in a well.

Those skilled in the art will further appreciate the advantages and superior features of the invention upon reading the detailed description which follows.

DESCRIPTION OF PREFERRED EMBODIMENTS

The present invention contemplates the addition of so-called microfine slag cement and conventional slag cements to oil-based drilling mud or similar inverted emulsions of hydrocarbon fluids to form a cementitious, oil-containing slurry. Compressive strength and rate of strength development can be adjusted by altering the composition proportions and by the addition of certain additives. It has been discovered that the characteristics of blast furnace slag cements and, in particular, microfine cements containing substantial amounts of slag cement impart a substantial rate of chemical activity and rate of hydration when present in certain oil-based drilling muds and inverted emulsions of water or brine water in hydrocarbon fluids. It is believed that the increased surface area of microfine slag cements allows these cements to draw water from an internal phase position in an oil-based mud emulsion. Moreover, caustics and carbonates are operable as slag cement accelerators and compositions such as hydrated lime, calcium carbonate and calcium chloride are generally present in oil base drilling muds. The presence of these compositions offsets or overcomes the adverse oil wetting and dilution effects of oil based muds and permits slag cements, in accordance with this invention, to rapidly gel and develop compressive strength. On the other hand, the presence of oil-based drilling muds and their oil-wetting surfactants may serve to slow the cement setting reaction to rates which make these cements useable for controlling lost circulation and for setting soft cement plugs or platforms in wellbores. As indicated previously, the gel and compressive strength of these cements may also be enhanced with the additions of such materials as amorphous silica, calcium sulfate, certain surfactants, water, styrene butadiene, latex, organophillic clays and certain clay modifiers, and similar drilling fluid additives.

The cement slurries specified hereinbelow may be injected into a wellbore using, generally, the method of mixing and circulating into the well which is described in U.S. Pat. No. 4,883,125, issued Nov. 28, 1989 to Wilson, et al, and the injection method described in U.S. Pat. No. 4,627,496, issued Dec. 9, 1986 to Ashford, et al, both assigned to the assignee of the present invention. However, the methods of placement of the novel cement compositions hereof are not confined to those described in the above-mentioned patents.

Certain test compositions, in accordance with present invention, show promising gel and compressive strength in accordance with the tabulations set forth herein. Each of the cement compositions set forth in Tables I and II was prepared by adding the respective cements in the amount of 300 lbs. per barrel (ppb) of fluid (42 U.S. gal. per barrel). The exemplary slag cement is a ground slag cement available under the trade name New Cem from Blue Circle Cement, Inc. of Crofton, Md. and having a Blaine fineness of about 520–580 (meters$^2$/kilogram). A microfine ground slag cement (Blaine fineness 1100–1200), also available from Blue Circle, may be advantageously used, also. The exemplary microfine cement used in the tests of Table II is of a type manufactured by Geochemical Corporation of Ridgewood, N.J. under the trade name MC-500 and comprises, by weight, 80% microfine slag cement and 20% microfine Portland cement having a Blaine fineness of about 900. Each test sample or specimen included, in addition to the cement, 15.0 ppb of sodium hydroxide, 15ppb of sodium carbonate and 3.0 ppb of nonionic surfactant/emulsifier of the type specified in each table. For example, the T-DET-N surfactants were added to each test sample in the amount of 3.0 ppb of fluid. The T-DET-N surfactants are commercially available from Harcros Chemicals, Inc., Kansas City, Kans., and are nonyl phenol compositions ethoxylated with ethylene oxide. The concentration of ethylene oxide and the percent active is indicated by the product identification number. For example, "507" indicates 50 moles of ethylene oxide, 70% active. The surfactant designated as Igepal/CO-887 is also an ethoxylated nonyl phenol having 30 moles ethylene oxide, 70% active, commercially available from Rhone-Poulenc, Princeton, N.J.

The test samples for which gel strength or viscosity and compressive strength are indicated in the tables set forth below were mixed in the amounts indicated above on a per barrel of mud basis with oil-based drilling mud having the following composition.

OIL BASED DRILLING "MUD" COMPOSITION

Oil—Conoco LVT 200 Mineral Oil—185.4 ppb
Primary Emulsifier—Versa-Mul, (hydrocarbon fatty acid composition)—7.0 ppb
Fluid loss control additive—Versa-Trol, (blown asphaltic composition)—7.0 ppb
Stabilizer—hydrated lime 5.0 ppb
Secondary Emulsifier—Versa-Wet, —(tall oil) 1.5 ppb
Calcium Chloride—97% to 98% pure—19.6 ppb
Viscosifier and suspending agent—Versa Gel, (organophillic clay)—4.0 ppb
Water—55.65 ppb
Weighting agent—Barite—245.0 ppb
Density—12.0 lbs. per gallon The above-mentioned materials identified by the trademark prefix "Versa" are commercially available from Magcobar-IMCO, Houston, Tex. The emulsion of the above fluid or "mud" composition places water in the internal phase as a calcium chloride brine. Moreover, the complete cement composition carries its own water for hydration of the cement while, at the same time, the oil wetting of the cement somewhat delays the hydration reaction to allow placement of the cement before it sets. An important function of the calcium chloride is to prevent leaching of the internal phase water into certain shales encountered during drilling operations as well as placement of the cement composition of the present invention. The hydrated lime or calcium hydroxide combines with the secondary emulsifiers to form a calcium soap or oil external emulsifier.

Table I shows the properties of certain slag cement in oil-based drilling mud compositions with various surfactants each added in an amount of 3.0 ppb and with and without additional water added to the composition on a per barrel basis. The slag cement with 30 pounds of additional water and 60 pounds of additional water per barrel of mixture indicated compressive strengths of 200 psi (pounds per square inch) and 425 psi, respectively, after 72 hours (3 days) and slightly higher compressive strengths after one week. However, as shown in Table II, the cement in oil-based drilling mud compositions using the microfine slag/Portland cement mixture (MC-500 Cement), particularly with additional water, showed suitable compressive strengths, and also when using the T-DET-N 507 and T-DET-N 307 nonyl phenol surfactants. These compressive strengths are suitable for setting plugs and platforms for cements and for control of lost circulation. The densities of the compositions in Tables I and II ranged from about 14.0 ppg to 14.77 ppg. The hydrophile-lipophile balance (HLB) of the compositions was as follows: with T-DET-N 1007, HLB 19.0, with T-DET-N 507, HLB 18.0, with T-DET-N 307, HLB 17.0 and with CO-887, HLB 17.2.

The tests which produced the results tabulated in Tables I and II were carried out with test specimens in accordance with API Specification 10 which were cured immersed in water at room temperature. Similar tests were carried out with specimens in sealed jars in a convection oven at 180° F. The specimens achieved similar compressive strengths in both environments and, unlike prior art diesel oil and slag cement and/or Portland cement compositions, the inventive compositions illustrated achieved hydration without depending on water from external sources such as water-based drilling fluids or water saturated earth formations as experienced by prior art compositions. Moreover, the strength of the cement compositions which have greater surface area resulting from microfine grinding of slag cements is not achievable with microfine ground Portland cements. In fact, specimens using microfine ground Portland cement substituted for the slag cement did not set or develop any compressive strength. The quantities of water and cement in the tests are exemplary. Slag cement may be present in the mixture in a range of from 200–700 ppb and water present in an amount up to 400 ppb.

Moreover, it is believed that such cement compositions wherein the oil is a hydrocarbon oil waste may be suitably fixed in disposal wells and the cement composition functions as a way of disposing of such hydrocarbon wastes. In other words, it is contemplated by the present invention that certain hydrocarbon oil wastes may be disposed of in deep wells by forming a cementitious slurry using the cement compositions set forth herein in the waste oil together with water as an internal or external phase component of an emulsion or as a dispersed mixture and wherein the water in all of the compositions functions to hydrate the cement to effect setting of the cement, a process which will not take place in the presence of oil alone.

TABLE I

| FLUID | ROOM TEMPERATURE viscosity - centipoises @ rpm | | | | PV | YP | 180° F. viscosity - centipoises @ rpm | | | |
|---|---|---|---|---|---|---|---|---|---|---|
| | 600 | 300 | 200 | 100 | | | 600 | 300 | 200 | 100 |
| Slag w/o Additional Water | | | | | | | | | | |
| T-DET-N 1007 | 542 | 312 | 222 | 126 | 230 | 82 | 384 | 270 | 216 | 136 |
| T-DET-N 507 | 600+ | 600+ | 456 | 262 | | | 588 | 376 | 270 | 164 |
| T-DET-N 307 | 734 | 450 | 308 | 168 | 284 | 166 | 356 | 176 | 172 | 112 |
| CO-887 | 540 | 314 | 226 | 124 | 226 | 88 | 330 | 208 | 148 | 100 |
| Slag w/30# Additional Water | | | | | | | | | | |
| T-DET-N 1007 | 376 | 216 | 152 | 82 | 160 | 56 | 350 | 238 | 180 | 108 |
| T-DET-N 507 | 432* | 256 | 168 | 92 | 176 | 100 | 236 | 148 | 114 | 74 |
| T-DET-N 307 | 434 | 230 | 166 | 94 | 204 | 26 | 264 | 170 | 134 | 88 |

TABLE I-continued

| | | | | | | | | | | |
|---|---|---|---|---|---|---|---|---|---|---|
| CO-887 | 420 | 236 | 170 | 96 | 184 | 52 | 270 | 174 | 132 | 88 |
| Slag w/60# Additional Water | | | | | | | | | | |
| T-DET-N 1007 | 432 | 254 | 182 | 106 | 178 | 76 | *66 | *48 | *36 | *20 |
| T-DET-N 507 | 376 | 230 | 172 | 104 | 146 | 84 | 210 | 146 | 106 | 72 |
| T-DET-N 307 | 312 | 168 | 124 | 62 | 144 | 24 | 234 | 152 | 120 | 82 |
| CO-887 | 450 | 232 | 146 | 82 | 218 | 14 | 358 | 168 | 134 | 94 |

| FLUID | PV | YP | Consist. 0' | Consist. 20' | Compressive Strength - psi 3 Day | Compressive Strength - psi 1 Wk | SET 1st Observed |
|---|---|---|---|---|---|---|---|
| T-DET-N 1007 | 114 | 156 | 25 | 15 | Fluid | Fluid | NS |
| T-DET-N 507 | 212 | 164 | 35 | 18 | Firm | Firm | 48 hrs. |
| T-DET-N 307 | 180 | −4 | 40 | 20 | 102 | 76 | 24 hrs. |
| CO-887 | 122 | 86 | 20 | 15 | 55 | 82 | 48 hrs. |
| T-DET-N 1007 | 112 | 126 | 20 | 12 | 100 | 125 | 72 hrs. |
| T-DET-N 507 | 88 | 60 | 20 | 15 | 132 | 133 | 24 hrs. |
| T-DET-N 307 | 94 | 76 | 30 | 14 | 200 | 253 | 24 hrs. |
| CO-887 | 96 | 78 | 18 | 16 | 153 | 305 | 24 hrs. |
| T-DET-N 1007 | *18 | *30 | 13 | 8 | 175 | 263 | 24 hrs. |
| T-DET-N 507 | 64 | 82 | 15 | 10 | 425 | 425 | 24 hrs. |
| T-DET-N 307 | 82 | 70 | 14 | 12 | 350 | 429 | 24 hrs. |
| CO-887 | 190 | −22 | 16 | 17 | 325 | 263 | 24 hrs. |

*Readings not indicative of true viscosity due to extreme thixotropy and emulsion instability.

TABLE II

| | ROOM TEMPERATURE viscosity - centipoises @ rpm | | | | | | 180° F. viscosity - centipoises @ rpm | | | |
|---|---|---|---|---|---|---|---|---|---|---|
| FLUID | 600 | 300 | 200 | 100 | PV | YP | 600 | 300 | 200 | 100 |
| MC-500 w/o Additional Water | | | | | | | | | | |
| T-DET-N 1007 | 600+ | 600+ | 582 | 364 | | | 600+ | 600+ | 600+ | 410 |
| T-DET-N 507 | 600+ | 600+ | 570 | 354 | | | 600+ | 600+ | 490 | 316 |
| T-DET-N 307 | 746 | 494 | 368 | 212 | 252 | 242 | 758 | 490 | 356 | 206 |
| CO-887 | 750 | 530 | 420 | 204 | 220 | 310 | 698 | 450 | 326 | 196 |
| MC-500 w/30# Additional Water | | | | | | | | | | |
| T-DET-N 1007 | 600+ | 600+ | 512 | 326 | | | 666 | 406 | 276 | 152 |
| T-DET-N 507 | 600+ | 600+ | 600+ | 436 | | | 120 | *60 | *44 | *26 |
| T-DET-N 307 | 1124 | 568 | 290 | 204 | 556 | 12 | 290 | 124 | 82 | 46 |
| CO-887 | 600+ | 600+ | 506 | 310 | | | 284 | 90 | 64 | 40 |
| MC-500 w/60# Additional Water | | | | | | | | | | |
| T-DET-N 1007 | 600+ | 600+ | 600+ | 480 | | | 74 | *50 | *44 | *40 |
| T-DET-N 507 | 600+ | 600+ | 600+ | 268 | | | 124 | *64 | *36 | *28 |
| T-DET-N 307 | 644 | 452 | 356 | 222 | 192 | 260 | 414 | 378 | 214 | 132 |
| CO-887 | 464* | 288 | 200 | 110 | 176 | 112 | 306 | 198 | 152 | 102 |

| FLUID | PV | YP | Consist. 0' | Consist. 20' | Compressive Strength - psi 3 Day | Compressive Strength - psi 1 Wk | SET 1st Observed |
|---|---|---|---|---|---|---|---|
| T-DET-N 1007 | | | 70 | 48 | 100C | 114C | 48 hrs. |
| T-DET-N 507 | | | 40 | 28 | NS | NS | 48 hrs. |
| T-DET-N 307 | 268 | 222 | 47 | 28 | 75 | 80 | 24 hrs. |
| CO-887 | 248 | 202 | 35 | 28 | 51 | 99 | 24 hrs. |
| T-DET-N 1007 | 260 | | 55 | 20 | 128 | 134 | 24 hrs. |
| T-DET-N 507 | *60 | *0 | 65 | 28 | 290 | 300 | 48 hrs. |
| T-DET-N 307 | 166 | −42 | 31 | 17 | 225 | 281 | 24 hrs. |
| CO-887 | 194 | −104 | 39 | 35 | 154 | 179 | 24 hrs. |
| T-DET-N 1007 | *24 | *26 | 90 | 18 | 200 | 270 | 24 hrs. |
| T-DET-N 507 | *60 | *4 | 48 | 25 | 260 | 313 | 24 hrs. |
| T-DET-N 307 | 36 | 342 | 40 | 20 | 203 | 213 | 24 hrs. |
| CO-887 | 108 | 90 | 20 | 18 | 54 | 79 | 48 hrs. |

*Readings not indicative of true viscosity due to extreme thixotropy and emulsion instability.

The viscosity measurements indicated were taken with a Fann viscometer using a no. 1 bob and sleeve rotating at the respective revolutions per minute noted in the table. The designations PV and YP refer to plastic viscosity and yield point, respectively, and are expressed in units of centipoises and pounds per hundred feet squared, respectively, measured at room temperature. The consistometer readings were taken at room temperature initially and after twenty minutes and are expressed in Bearden units of consistency in accordance with API Specification 10.

The present invention also contemplates a method of forming a plug or "platform" in a wellbore containing an oil-based drilling mud wherein a quantity of slag cement may be mixed in water or a hydrocarbon fluid with or without the surfactants and other modifiers but without the chemical activators, such as the caustics or carbonates, and then pumped downhole wherein the activators are present in the drilling mud, either water based or oil based, which will accomplish rapid setting of the slug of cement composition. Still further, a method is contemplated wherein, if the setting activators are not present, these activators could be added by overwashing a mixture of slag cement and water or oil based drilling fluid, with or without the surfactants, in certain squeezing and plugging operations. Moreover, slag cement mixtures in accordance with the present invention suffer fewer detrimental effects from water based or oil based mud contamination and thus provide compressive strength development superior to conventional Portland cements. Contaminated cement plugs that will not set when Portland cement is the cementitious material will still form relatively hard plugs when slag cement is substituted for the Portland cement material.

Those skilled in the art will appreciate that the surprising results obtained with forming cementitious slurries using oil-based drilling muds with water as the internal phase in the emulsion and particularly in the presence of the nonyl-phenol surfactants and a hydroxide or carbonate activator provides for an improved cement composition which is suitable for plugging formation regions which would contribute to lost circulation of drilling fluid, setting plugs and platforms in wellbores and forming settable compositions which will fix certain waste materials in disposal wells and disposal zones of earth formations. Although preferred embodiments of slag cement compositions in both conventional cement particle sizes and so-called microfine cement particles have been described herein, those skilled in the art will recognize that various substitutions and modifications may be made to the compositions without departing from the scope and spirit of the invention as set forth in the appended claims.

What is claimed is:

1. A cement composition for at least one of wellbore operations and fixation of an oil waste in a subterranean formation, said composition comprising:

a hydrocarbon oil, up to 400 pounds per barrel of water present in a water-in-oil emulsion, a cement mixture of about 80% slag cement and 20% Portland cement by weight having a Blaine fineness of at least as great as about 900 and wherein said slag cement is present in an amount of from 200 to 700 pounds per barrel, at least one emulsifier comprising one of a hydrocarbon fatty acid, blown asphaltic and at least one non-ionic surfactant which aids hydration of said cement mixture; and a cement setting accelerator selected from a group consisting of sodium hydroxide and sodium carbonate.

2. The composition set forth in claim 1 wherein: said water is present in the form of a brine.

3. The composition set forth in claim 2 wherein: said brine is a calcium chloride brine.

4. The composition set forth in claim 1 wherein: said surfactant is a nonyl phenol-ethylene oxide composition.

* * * * *